United States Patent [19]

Shida

[11] Patent Number: 4,616,268
[45] Date of Patent: Oct. 7, 1986

[54] METHOD AND SYSTEM FOR INCREASING USE EFFICIENCY OF A MEMORY OF AN IMAGE REPRODUCING SYSTEM

[75] Inventor: Junji Shida, Kyoto, Japan

[73] Assignee: Dainippon Screen Mfg. Co., Ltd., Kyoto, Japan

[21] Appl. No.: 586,121

[22] Filed: Mar. 5, 1984

[30] Foreign Application Priority Data

Jun. 20, 1983 [JP] Japan ................. 58-111670

[51] Int. Cl.$^4$ .............................. H04N 1/04
[52] U.S. Cl. .................. 358/287; 358/280; 358/77; 382/47
[58] Field of Search .............. 358/287, 77, 280; 382/47

[56] References Cited

U.S. PATENT DOCUMENTS 4,305,093 12/1981 Nasu ........................... 358/287
4,454,537 6/1984 Okada et al. ................. 358/287

Primary Examiner—James J. Groody
Assistant Examiner—Edward L. Coles
Attorney, Agent, or Firm—Lowe Price LeBlanc Becker & Shur

[57] ABSTRACT

In reproducing images, number of the pixels on one scanning line of an original picture is made to correspond to number of the addresses of a memory to increase use efficiency of the memory as well as to improve the detail of reproduction images.

19 Claims, 13 Drawing Figures

METHOD AND SYSTEM FOR INCREASING USE EFFICIENCY OF A MEMORY OF AN IMAGE REPRODUCING SYSTEM

FIELD OF THE INVENTION

This invention relates to a method and system for increasing use efficiency of a memory of an image reproducing system in which image data obtained from an original picture are once stored in the memory and read to be used for recording a reproduction image.

BACKGROUND OF THE INVENTION

Conventionally, a memory of an image reproducing system such as a color scanner is composed of several line memories, each of which has a capacity corresponding to image data of one scanning line. Therefore, the capacity of the memory is regulated by the length (this word is defined in this specification as the length in the main scanning direction of an original picture (also limited by the circumference of an input drum) or by the length of a reproduction image (likewise limited by the circumference of a recording drum). However, usually only a portion of an original picture is desired to be reproduced, so the length of the portion is naturally shorter than that of the original picture. Actually, the length of the portion is a fraction of that of the original picture. Since any conventional image reproducing system stores all the image data of one scanning line of an original picture into a memory, the image data includes needless data.

FIG. 1(a) shows useless portions of an original picture I and its reproduction image II when the magnification ratio M is $M \geq 1$. FIG. 1(a) shows the same when $M < 1$.

In FIGS. 1(a), (b), the length lp of the original picture I comprises the lengths of the portion to be reproduced and that of the useless portion. Image data of both portions are stored into a memory and read to be used for recording a reproduction image of length $l_R$ which also comprises the portions of lengthes $l_{R1}$ and $l_{R2}$.

Therefore the memory is compelled to deal with unwanted image data corresponding to the portion of length $l_{p2}$ (of the input side) or $l_{R2}$ (of the output side). Incidentally in FIGS. 1(a)(b), length $l'_p$ is the circumference of an original picture drum, and length $l'_R$ is the circumference of a recording drum when the magnification ratio M between both sides are $M = 1$.

FIGS. 2(a)(b) show useless portions of original pictures I and their reproduction images II when (a) two or (b) four color separation images are recorded.

In this case, image data obtained by scanning the original pictures also comprises the image data corresponding to the portions of length $l_{p2}/2$ or $l_{p2}/4$ of the original pictures. In addition, there are provided spaces S between each of the color separation images.

Actually, useless image data corresponding to the spaces S are stored in the memory, they are invalidated by being masked when a reproduction image is recorded.

Consequently, the image data stored in the memory comprises the useless image data corresponding to the portion of length $(l_{R2}/2) + S$ or $(l_{R2}/4) + S$.

Although FIGS. 2(a), (b) are based on a condition that the magnification ratio M is $M < 1$, the same thing can be said for a case $M \geq 1$. In FIG. 1 and FIG. 2, the magnification ratio M is expressed by an equation $M = l_r/l_p = l_{R1}/l_{p1}$.

SUMMARY OF THE INVENTION

A prime object of this invention is to increase use efficiency of a memory of an image reproducing system in order to improve resolving power of a reproduction image. Specifically, image data of one scanning line corresponding to a necessary portion of an original picture are stored into all the cells of a memory. That is, the frequency of a writing pulse for the image data is increased as the length of the original picture becomes shorter (scanned in higher resolving power), or decreased as the length of the original picture becomes longer (scanned in lower resolving power). When spaces are desired to be provided in between color separation images, image data corresponding to the spaces are not input to the memory.

The above and other objects and features of this invention can be appreciated more fully from the following detailed description when read with reference to the accompanying drawings.

PREFERRED EMBODIMENT OF THE INVENTION

Figure 1A:
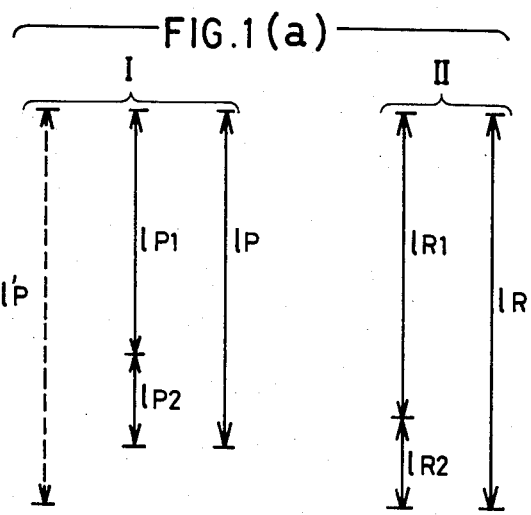
FIG. 1 shows useless portions of an original picture and its reproduction image for a single original picture.
Figure 1B:
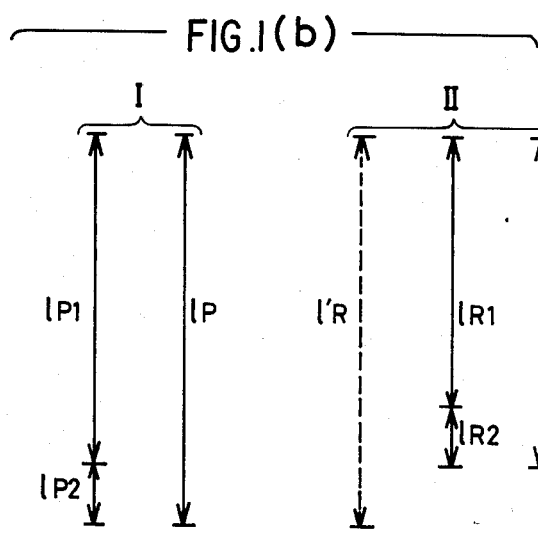
Figure 2A:
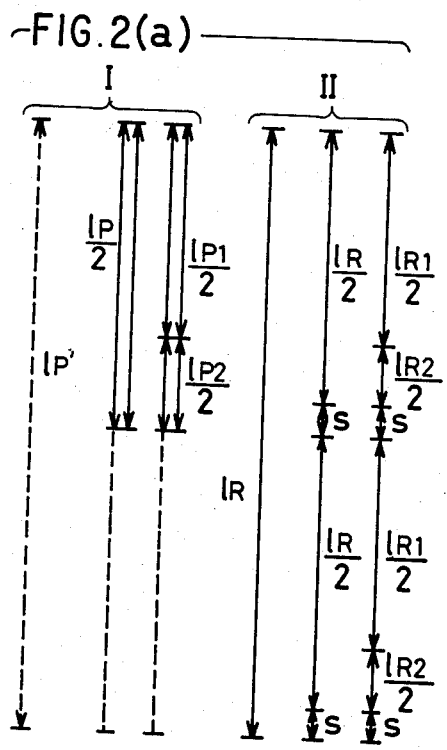
FIG. 2 shows useless portions of original pictures and their reproduction images when the original pictures are two or four color separation images.
Figure 2B:
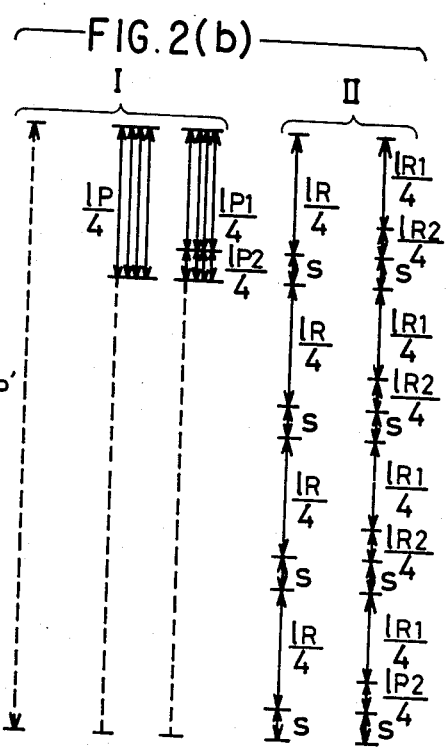
Figure 3A:
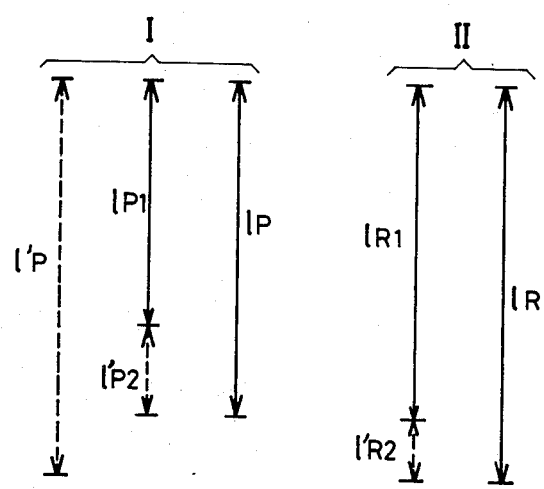
FIG. 3 shows the concept of this invention indicating how a memory is used for memorizing single image.
Figure 3B:
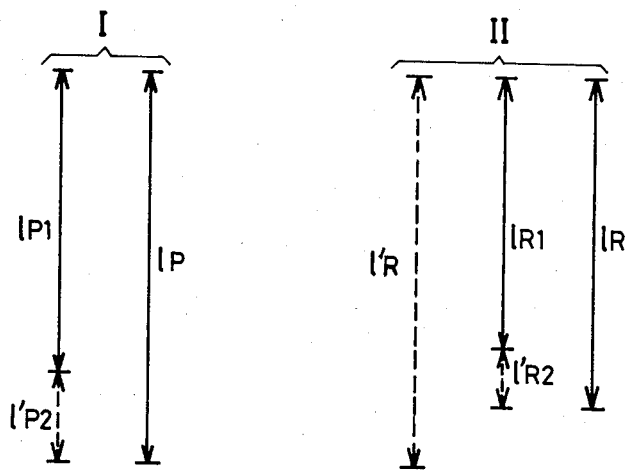
Figure 4A:
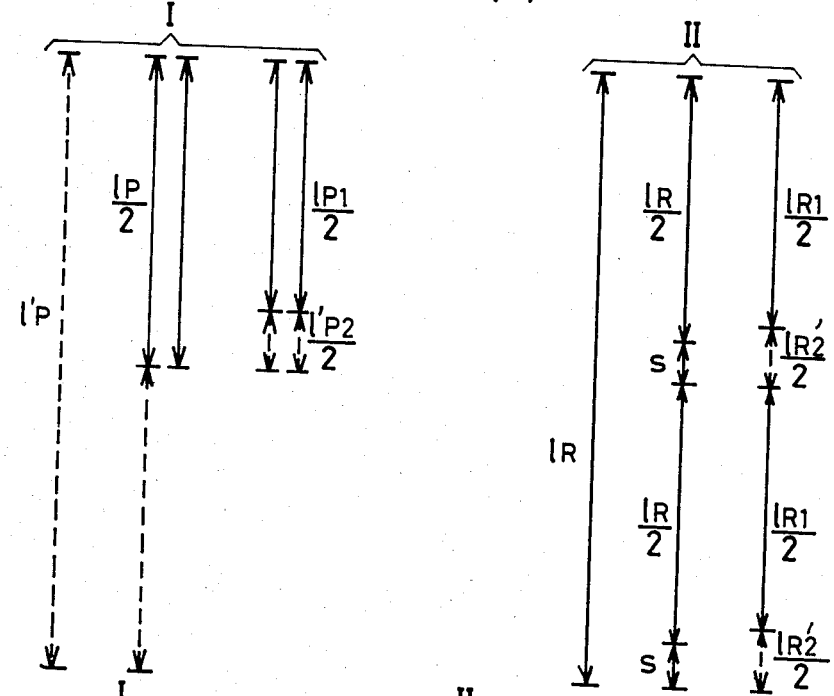
FIG. 4 shows how a memory is used for memorizing two or four images.
Figure 4B:
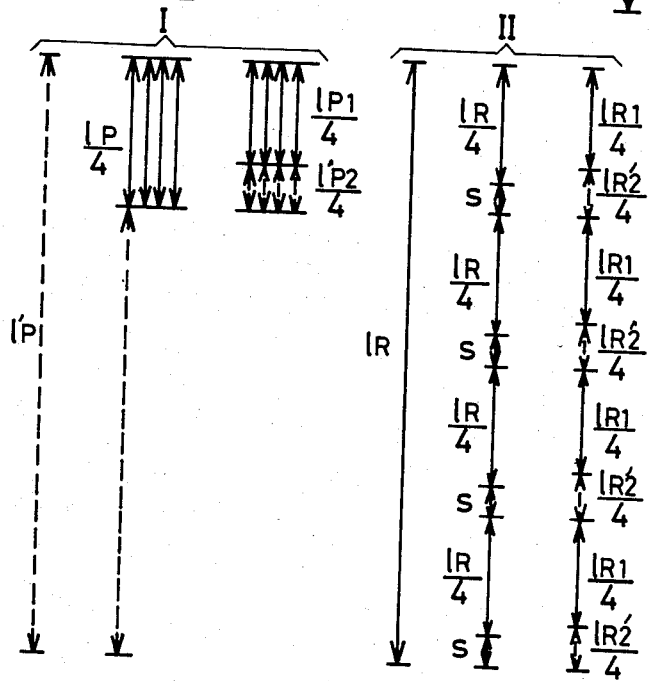

FIG. 3(a) shows the concept of this invention in which a single color separation image is reproduced when the magnification ratio M is $M > 1$. FIG. 3(b) shows the same when $M \leq 1$. FIGS. 4(a),(b) show the concept of this invention in which (a) two or (b) four color separation images are reproduced. The image data of the portion of lenth $l_{P1}$ or $l_{R1}$ ($l_{P1}/2$ or $l_{R1}/2$, or $l_{P1}/4$ or $l_{R1}/4$) are allotted to all the cells of the memory. That is, the memory cells which conventionally store the data of the portion of length $l'_{P2}$ or $l'_{R2}$ ($l'_{P2}/2$ or $l'_{R2}/2$, or $l'_{P2}/4$ or $l'_{R2}/4$) are added to the conventional memory cells for the portions of the length $l_{P1}$ or $l_{R1}$ ($l_{P1}/2$ or $l_{R1}/2$, or $l_{P1}/4$ or $l_{R1}/4$), which increases use efficiency of the memory as well as improves resolving power of the image reproducing system. By the way, if the spaces S are desired to be provided on the reproduction image, each of the plural color separation images are read from the memory at regular intervals.

Thus by using the memory efficiency, another image can be recorded on a photosensitive film when enough space is there.

Figure 5:
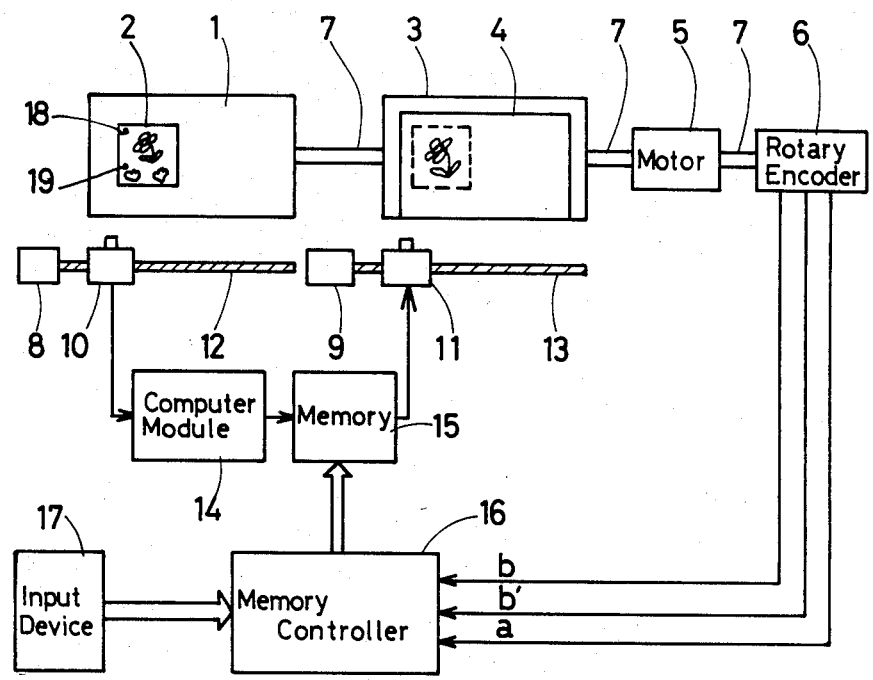
FIG. 5 shows a system for realizing the method of this invention.

FIG. 5 shows a system for realizing the method of this invention, which comprises an original picture drum 1, an original picture 2, a recording drum 3, a photosensitive film 4, a drum motor 5, a rotary encoder 6, a shaft 7, an input head feeding motor 8, a recording head feeding motor 9, an input head 10, a recording head 11, an input head feeding gear 12, a recording head feeding gear 13, a computer module 14, a digital memory 15, a memory controller 16 and an input device 17. The input scanning process is started from the point 18 and stopped at the point 19.

In the system of FIG. 5, the original picture drum 1, the recording drum 3, the drum motor 5 and the encoder 6 are connected by the shaft 7 and revolve coaxially. A laser beam emitted from an unindicated beam producer is provided with image data information of the original picture 2 by being transmitted through or reflected at the original picture and is input to the input head 10 to provide analog image data. The analog image data undergoes several processes such as color correction or gradation modification in the computer module 14 and is then converted into digital image data by a writing pulse generated in the memory controller 16 to be input to the memory 15. Then the image data in the memory 15 are read by a reading pulse generated in the memory controller 16 to the recording head 11 to be used for recording a photosensitive film 4. In this, the frequency ratio between the reading pulse and the timing pulse is the magnification ratio of the main scanning direction. On the other hand, the input head 10 and the recording head 11 are fed by a distance equivalent to the width of one scanning line along respective feeding gears 12 and 13 by respective motors 8 and 9. The ratio of the two distances is the magnification ratio of the sub-scanning direction.

Figure 6:
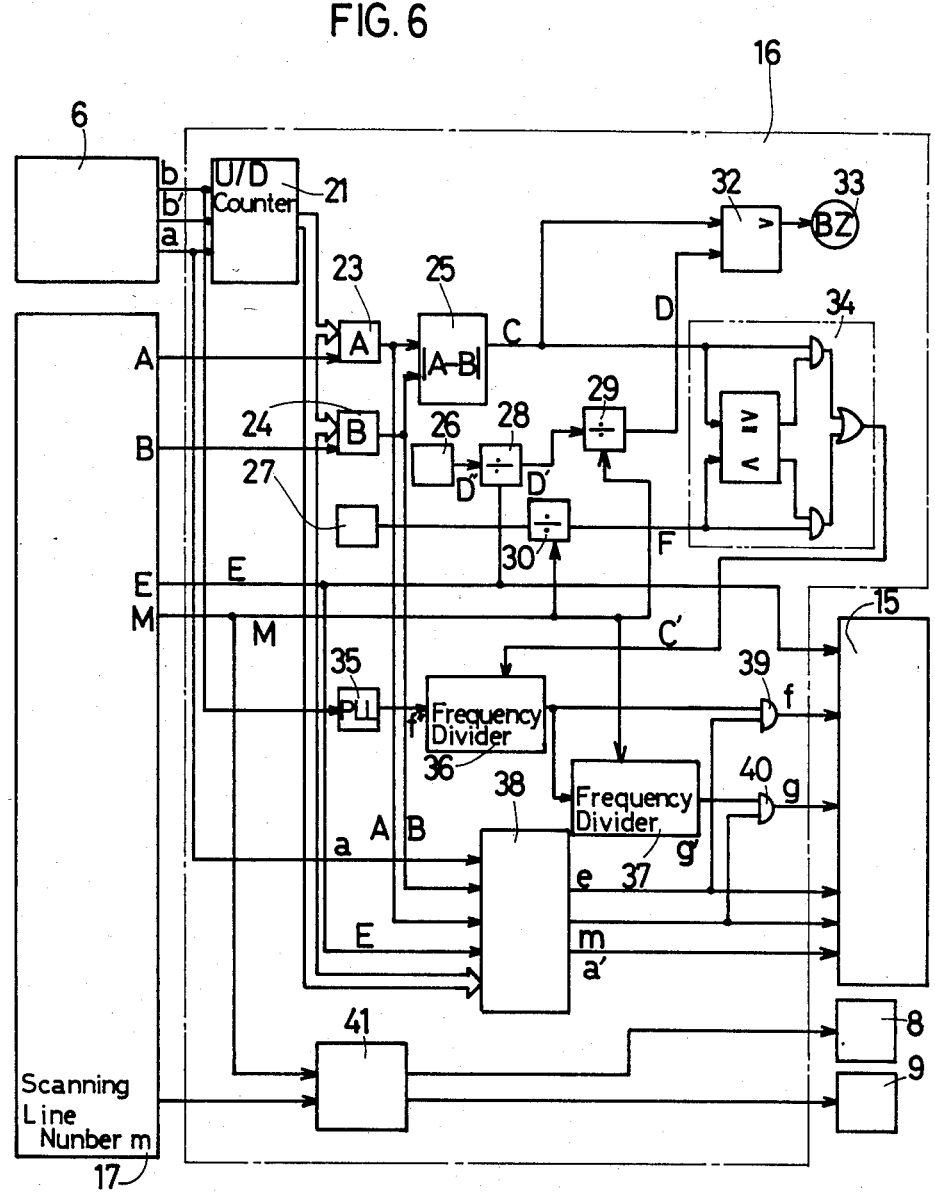
FIG. 6 shows a block diagram of a memory control device according to the invention.
Figure 7:
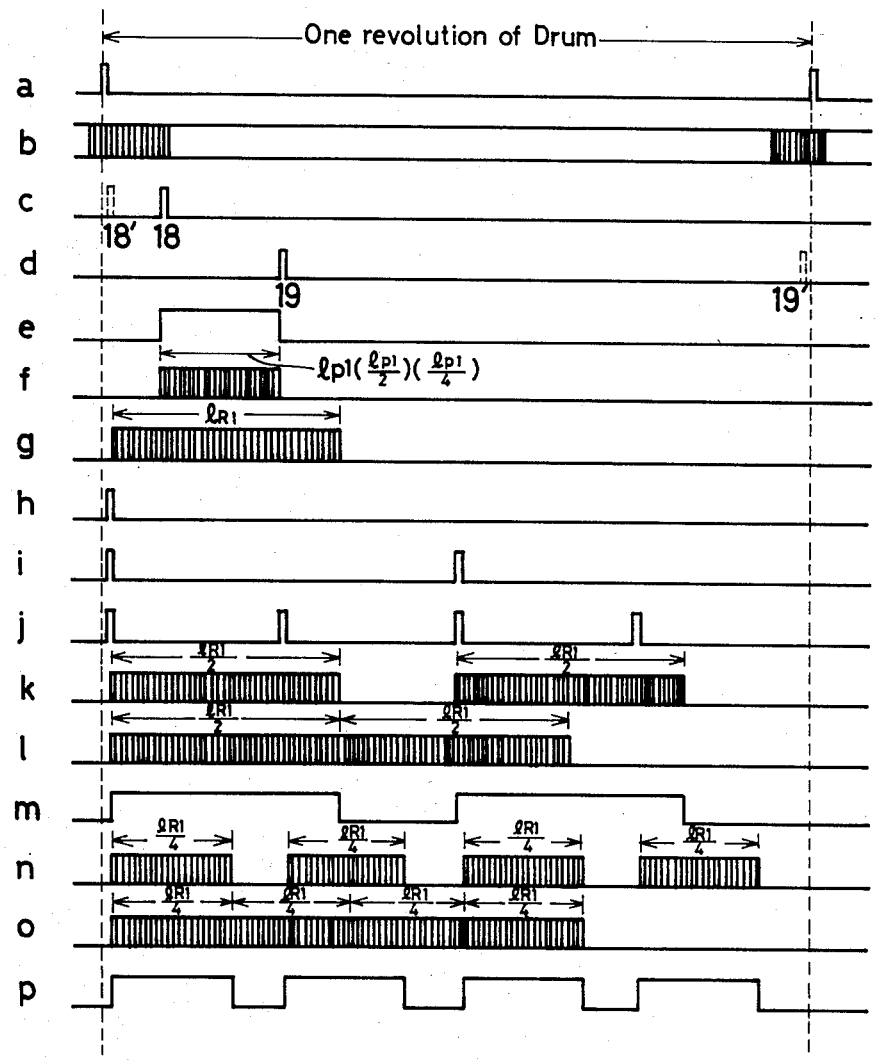
FIG. 7 shows the timing chart of the memory control device shown in FIG. 6.

The following explanation is based on FIGS. 6 and 7.

FIG. 6 shows an embodiment of the memory controller of this invention. The units shown commonly in FIG. 6 and 5 are numbered the same. FIG. 6 comprises an up-down counter 21, a start point memory 23 (a D-flip-flop circuit or a latch), an end point memory 24 (a D-flip-flop circuit or a latch), a subtractor 25, a maximum scanning length setter 26, a minimum scanning length (limited by memory capacity) setter 27, dividers 28, 29 and 30, a comparator 32, a start and end point warning buzzer 33, a scanning length comparator 34, a PLL circuit 35 (multiplier), frequency dividers 36 and 37, a timing pulse generator 38, AND-gates 39 and 40 and a sub-scanning controller 41 for controlling motors 8 and 9.

FIG. 7 shows the timing chart of the memory controller 16.

The rotary encoder 6 outputs to the up-down counter 21 one pulse (a) generated every one revolution of the original picture drum, an n time pulse (b) generated n times for each revolution of the input drum and a pulse (b') having a phase difference of 90° with respect to the pulse (b). The pulse (a) is used for resetting the count number of the counter 21. Since the polarity of the phase difference between the pulses (b) and (b') indicates the revolving direction of the original picture drum 1, according to the polarity of each case, the count number of the counter 21 is increased or decreased by the pulse (b) or (b'). Meanwhile, the count number of the counter 21 means the scanning position in the main scanning direction of the input head 10 respecting to the original picture drum 1.

Before revolving the original picture drum 1 for input scanning, the following procedure is performed. When an operator manipulates the drum 1 to set the start point 18 of the original picture 2 the starting point is situated right against the input head 10 and the operation pushes a start point button of the input device 17. An unindicated OSMV (one shot multi-vibrator) outputs a pulse to the memory 23. Then the memory 23 takes in the output value A of the counter 21, which also corresponds to the start point 18. In the same manner, the memory 24 takes in the output value B of the counter 21, which corresponds to the stop point 19. The subtractor 25 performs a subtraction $|A-B|=C$ (C: the length of the portion of interest of original picture 2) by using the values A and B. The divider 28 performs a division $D'=D''/E$ (D'': the number of all the memory cells, E: the number of color separation images: 1, 2, or 4. Then the divider 29 performs a division $D=D'/M$ ($=D''/M\cdot E$) (M: a magnification ratio). The obtained value D means the maximum length of the reproduction image which can be recorded.

Thus obtained values C and D are input to the comparator 32 which compares the value C to the value D. When the value C is bigger than D, which means the length of the original picture is longer than the maximum length of the reproduction image being able to be recorded, the comparator 32 outputs "H" signal to make the warning buzzer operate. This procedure is provided to determine whether the length D of the reproduction image exceeds that of the total length C (the length of the original picture)×E (the number of color separation images).

The minimum scanning length setter 27 is provided with a value F' obtained by multiplying the minimum possible scanning length (lower limit is the length of one pixel) regulated by the maximum sampling frequency by the number of all the memory cells. Thus, if an original picture is shorter than the minimum possible scanning length, its image data can not be allotted to all the memory cells. The divider 30 performs a division $F=F'/M$ (F: the minimum possible scanning length for using all the memory cells in the condition of the magnification ratio of M).

The selector 34 compares the value C to the value F, and outputs the value C when $C \geq F$ or outputs the value F when $C < F$ as value data C.

When the motor 5 revolves (operates), the PLL circuit 35 multiplies the pulse (b) input from the rotary encoder 6 to output a pulse (f'') to the frequency divider 36. The frequency divider 36 performs a division $f'=f/c'$. The timing pulse generator 38 generates a window pulse (e) by using the value data A corresponding to the start point 18 and the value data B corresponding to the stop point 19. The pulse (e) is a signal which is "h" in between the points 18 and 19. Then the pulse (e) controls the and-gate 39 to input a pulse (f) to the memory 15. When $C \geq F$, the frequency ((f')) of the pulse (f) is equivalent to the number $D'=D''/E$ (D'': the number of all the memory cells, E: the number of the color separation image (s)). When $<F$, fewer of the memory cells are used.

By using the number E and the pulse (f) the image data are written into the memory 15.

When plural color separation images are recorded, image data of each are written into respective line memories.

Then the image data are read from the memory 15 according to one of the timing pulses (g) meaning one color separation image), (l) (meaning two color separation images) and (o) meaning four color separation images). In this, the timing pulses (g), (l) and (o) are output continuously until all the image data are read from the memory 15. These timing pulses (g), (l) and (o) are obtained by dividing the frequency of the pulse (f) from the frequency divider 36 by I/M in the frequency divider 37 (a pulse (g') is obtained) under control of AND-gate 40. In a case plural color separation images are recorded with spaces S between them, timing pulses n or k are used. The pulses n are obtained by dividing the pulse (l) by a window pulse (m) by the AND-gate 40, which is used for recording two color separation images. The pulse (k) is obtained by dividing the pulse (o) by a window pulse (p) under control of the AND-gate 40, which is used for recording four color separation images.

Pulses (h), (i) and (j) are timing pulses for controlling the pulses (k) and (n).

The sub-scanning controller 41 controls the motors 8 and 9 according to a scanning line number selection signal and a magnification ratio signal from the input device 17 for designating the magnification ratio M. Since this is a well-known device, no further description for it is given here.

Incidentally, the interval between the start point 18 and the stop point 19 can be expanded as much as possible. Said interval can also be set gradually. When the resolving power of plural color separation images must be unified, the length corresponding to the interval between A and B of every color separation image must be unified. When the start points A of plural color separation image don't locate on the same line, the circuit shown in FIG. 8 can be used.

Figure 8:
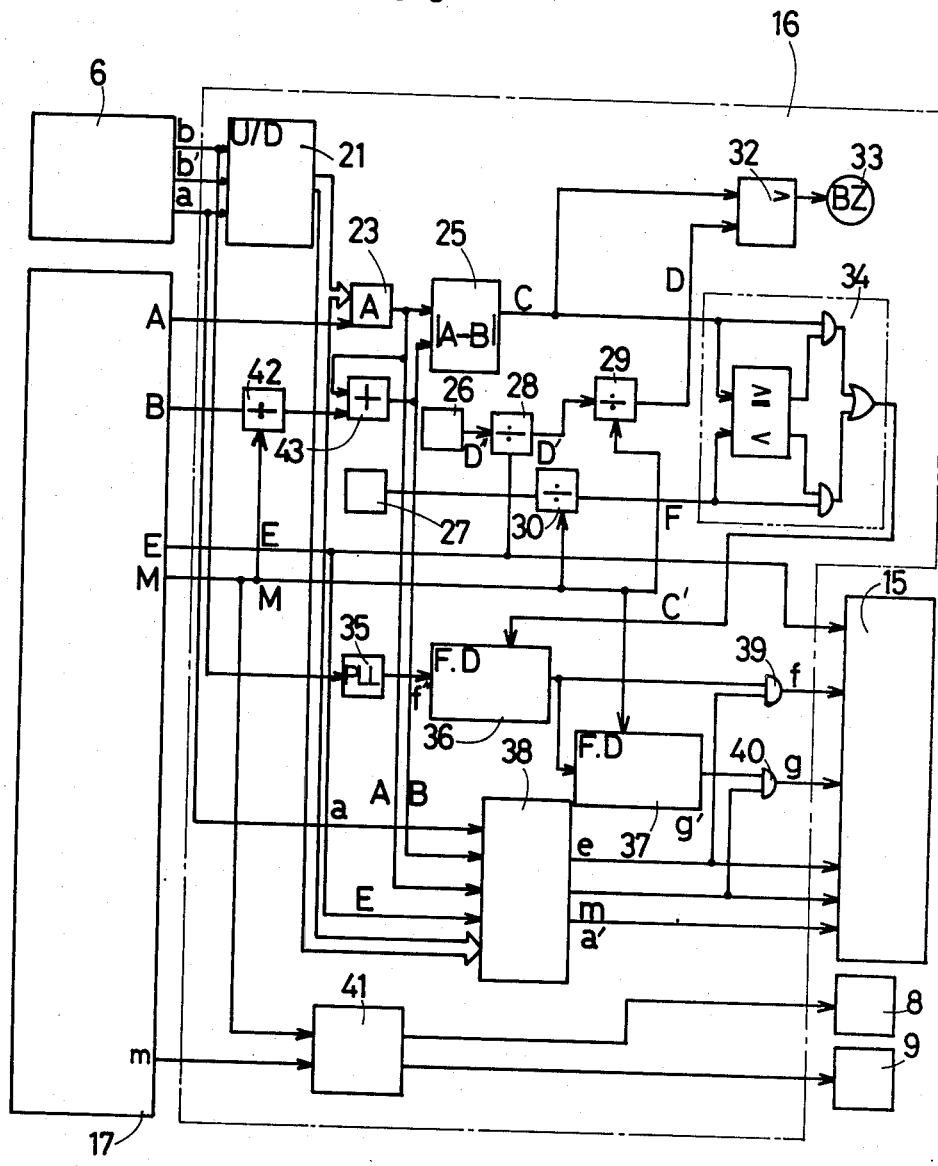
FIG. 8 shows another embodiment of the memory control device.

The circuit of FIG. 8 is equivalent to the circuit of FIG. 6 in which a divider 42 is provided and an adder 43 is substituted for the memory 24. The circuit of FIG. 8 has an aim of setting up an arbitrary length (on the recording drum) instead of the stop point 19.

The arbitrary length (on the recording drum) is set up as follows. At first, it is divided by the magnification ratio M in the divider 42 to correspond to the length on the original picture drum. The resultant value is added to the value A in the adder 43 to correspond to the stop point B. If the scales on both sides agree, the divider 42 is not necessary.

In the method of this invention, magnification conversion in the main scanning direction is attained by varying the frequency ratio between the writing pulse and the reading pulse, whereas another method can also be adopted.

A method discloses that the frequency ratio between a writing pulse and a reading pulse in a memory are read in a skipped or in an overlapped fashion to reproduce an enlarged or reduced image. Another method discloses that the revolution ratio between an original picture drum and a recording drum is varied, while the frequency ratio between a writing pulse and a reading pulse is fixed, while image data stored in even or constant. When the method of this invention is used for recording a photosensitive film, the parts which are coventionally useless (wastefully exposed) are not exposed. So as to fulfill the unexposed parts, the method disclosed in U.S. application Ser. No. 518,837 can be applied. The method is for increasing efficiency of use of a photosensitive film.

As mentioned above, the method of this invention increases use efficiency of a memory by utilizing the part of the memory which is conventionally used for storing unnecessary image data, which enables the pixels of reproduction images to be smaller in the main scanning direction. In other words, the reproduction images are more detailed than conventional ones.

The above description is based on a drum scanner. However, the method of this invention can also be applied to a laser beam scanner.

I claim:

1. A method for increasing use efficiency of a memory of an image reproducing system in which image data obtained by scanning an original picture are stored in a memory having a number of memory cells and then read to be used for recording a reproduction image comprising the steps of:
    (a) obtaining a unit length (pixel length) by dividing a length of a portion of the original picture by substantially the entire number of cells of the memory;
    (b) storing image data of each pixel of the portion of the original picture; and
    (c) reading the image data from the memory in a desired magnification ratio.

2. A method as claimed in claim 1, in which the obtaining step comprises a step of obtaining a signal corresponding to an inverse number of the length of the portion and in which said storing step comprises the step of obtaining a writing pulse having a frequency which corresponds to the number of memory cells.

3. A method as claimed in claim 2, in which said reading step comprises a step of reading the image date by a reading pulse having a frequency which corresponds to that of said writing pulse according to the magnification ratio.

4. A method as claimed in claim 2, in which said reading step comprises a step of reading the image date by a reading pulse having a frequency equivalent to said writing pulse in a skipped or in an overlapped fashion according to the magnification ratio.

5. A method as claimed in claim 2, in which the length of the portion of the original picture is less than the length obtained by dividing the maximum possible recording length by the product of a number of color separation images and the magnification ratio.

6. A method as claimed in claim 2 comprising the further step of limiting the frequency of the writing pulse by a length F (F: the minimum length of a portion of an original picture which can be stored into all the addresses of the memory as image data) when F is longer than C (C: the length of said portion of the original picture).

7. A method as claimed in claim 2 comprising the further step of determining the length of the portion of the original picture by dividing the length of the portion to be reproduced by the product of M (M: the magnification ratio) and E (E: a number of the color separation images).

8. A system for increasing use efficiency of a memory of an image reproducing system in which image data obtained by scanning an original picture are stored in a memory having a number of addressable memory cells and then read to be used for recording a reproduction image comprising:
    (a) a means for obtaining a unit length (pixel length) by dividing a length of a portion of the original picture by substantially the entire number of cells of the memory;
    (b) a means for storing image data of each pixel of the portion of the original picture; and
    (c) a means for reading the image data from the memory on command of a reading pulse of a certain frequency in a desired magnification ratio.

9. A system as claimed in claim 8, in which means (a) comprises a means for obtaining a signal corresponding to an inverse number of the length of the portion and in which means (b) comprises a means for obtaining a writing pulse having a frequency corresponding to the number of memory cells.

10. A system as claimed in claim 9, in which means (c) comprises a means for reading the image data by a reading pulse having a frequency which corresponds to that of said writing pulse according to the magnification ratio.

11. A system as claimed in claim 9, in which means (c) comprises a means for reading the image data by a reading pulse having a frequency equivalent to said writing pulse in a skipped or in an overlapped fashion according to the magnification ratio.

12. A system as claimed in claim 9, further comprising a means for comparing C (C: the length of the portion of the original picture) to F (F: a minimum length of a portion of the original picture which can be stored into all the addresses of the memory as image data) and output either (a) C when C is longer than F or (b) F when C is shorter than F to a means for generating the writing pulse.

13. A method for improving a resolution power of an image reproducing system by increasing use efficiency of a memory in which image data obtained by scanning an original picture are stored in a memory having a predetermined number of cells and are read from the memory to record reproduction picture, comprising the steps of:
  (a) determining a first point A and a last point B of a portion of an original picture to be scanned and reproduced;
  (b) determining a length C of the portion to be scanned of the original in accordance with an equation: $C = |A - B|$;
  (c) dividing by said length C frequency of pulses which have been generated by a rotary encoder and multiplied by a PLL circuit to obtain writing pulses for the memory which determine a length of a picture element,
  (d) storing in the memory during scanning of the original only the portion of the original picture between said points A and B in compliance with said writing pulses provided to the memory,
  (e) dividing the frequency of said writing pulses by a desired magnification M to obtain reading pulses, and
  (f) reading the image data from the memory in compliance with said reading pulses to control a recording head.

14. A system for improving resolution of an image reproducing apparatus by increasing efficiency of memory usage so that substantially all cells of the memory are used to store only a desired portion of an image, comprising:
  (a) means for providing picture elements, said picture elements having a size made smaller in accordance with a size of said portion, said means providing said elements for representation by individual image data points stored in individual ones of the memory cells; and
  (b) representing means for using all the memory cells to represent the desired portion of the image.

15. A system as recited in claim 14 wherein said means for providing includes allotting means for allotting image data of a predetermined portion of the image to substantially all the cells of the memory, including cells otherwise storing data of undesired portions of the image, and
said representing means includes means for generating writing pulses for writing image data into the memory cells.

16. A system as recited in claim 15 wherein said allotting means includes means for determining a first point A and a last point B of the predetermined portion of the image to be scanned,
length determining means for determining a length C of the portion to be scanned in accordance with an equation: $C = |A - B|$ and
wherein said means for generating writing pulses includes dividing means for dividing a frequency of said pulses by said length C of the portion to be scanned.

17. A system as recited in claim 16 further comprising means for generating reading pulses for reading data from the memory cells, including second dividing means for dividing the frequency of said writing pulses by a predetermined magnification ratio M to obtain said reading pulses, and
reading means for reading the image data from the memory in response to said reading pulses.

18. A system as recited in claim 14 wherein the image reproducing apparatus includes coaxially driven original and recording drums, said drums driven by a single motor for common rotational speed.

19. A system as recited in claim 14 further comprising means for producing a plurality of color separation images by reading images of the original at predetermined timing intervals.

* * * * *